March 8, 1927.                                              1,619,940
                        M. L. KAPLAN
                   CUTTING BOARD AND GUIDE
                    Filed July 21, 1926           2 Sheets-Sheet 1
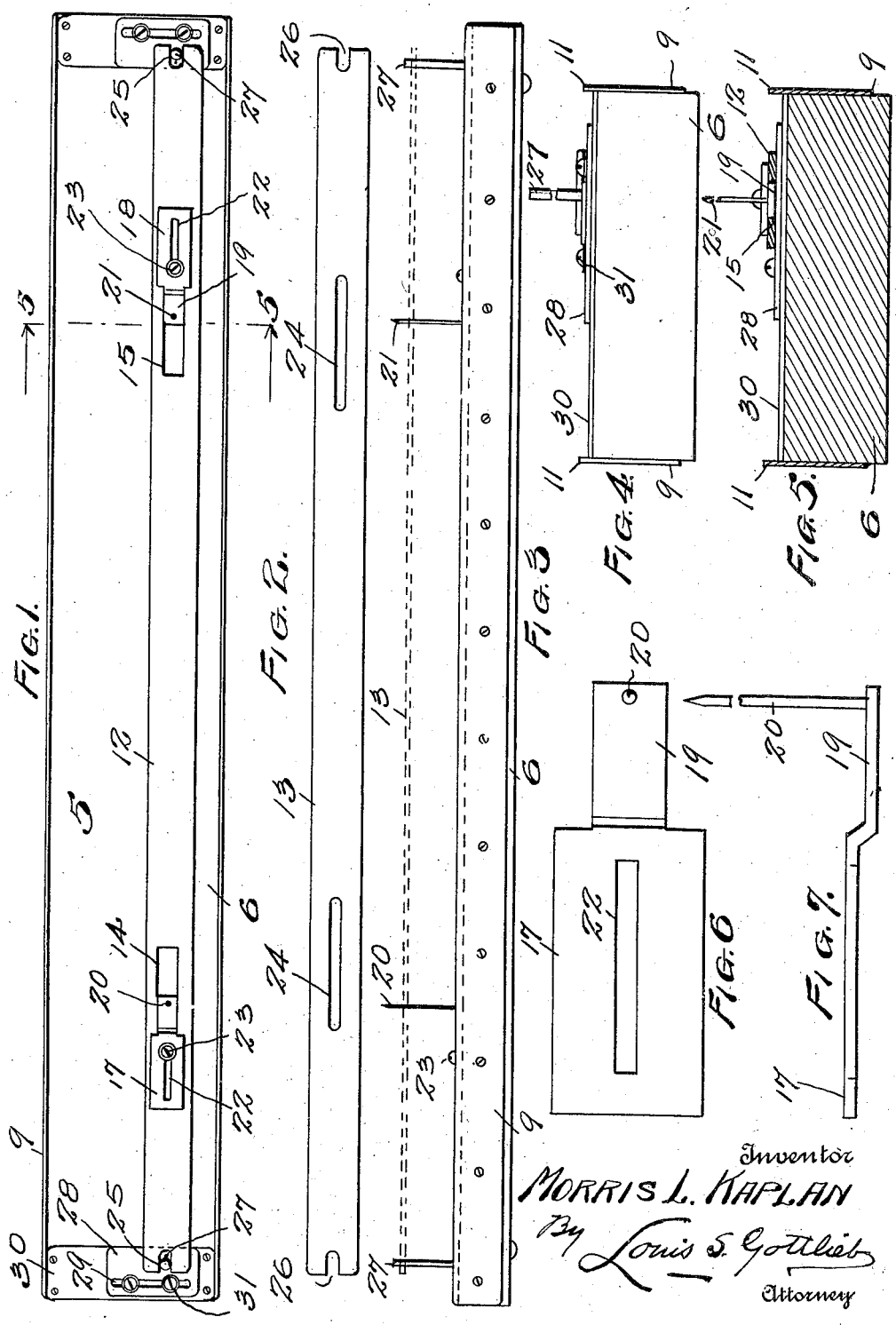
Inventor
MORRIS L. KAPLAN
By Louis S. Gottlieb
Attorney

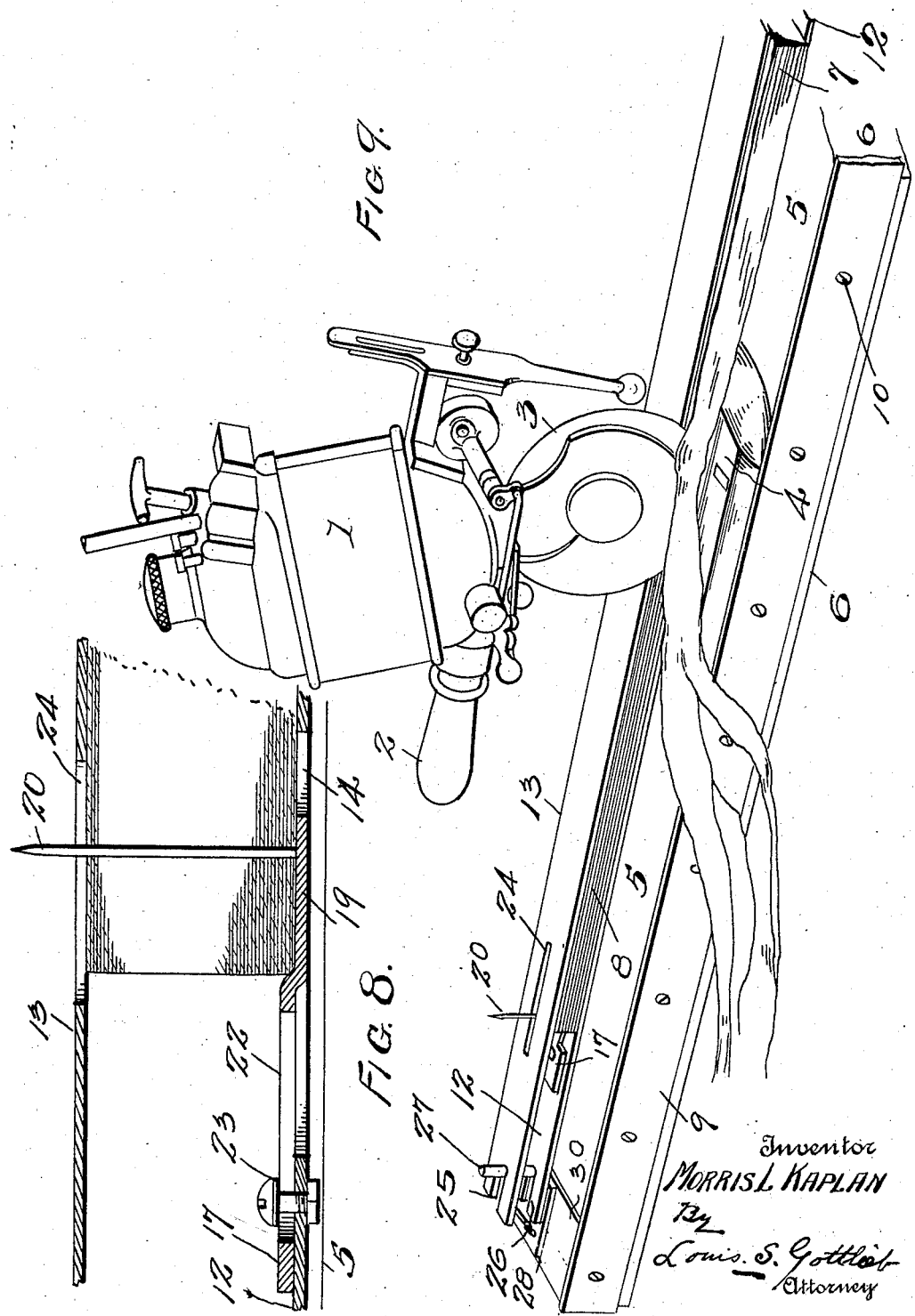

Patented Mar. 8, 1927.

1,619,940

UNITED STATES PATENT OFFICE.

MORRIS L. KAPLAN, OF HAZLETON, PENNSYLVANIA.

CUTTING BOARD AND GUIDE.

Application filed July 21, 1926. Serial No. 123,926.

My present invention relates to an improved cutting board and guide for use in connection with a motor operated, manually controlled cutting machine, having a rotary cutter or cutting disk. While the improved board and guide are adapted for use with various commodities requiring a straight cut, they are particularly designed for use in shirt factories and similar places, as a guide for cutting pin shirt box-pleats centers, straight edges, and other pin straight line work.

The invention contemplates the utilization of a cutting board and a combined holder and guide device adapted to retain a packet of material, as pleats, on the board, which holder is interchangeable in order that the longitudinal edges of the retained packet of pleats may be trimmed or cut in the accurate formation of the pleats.

The combined holder and guide are provided with adjustable means to accommodate various widths and lengths of material, and the device is readily detachable and with equal facility may be attached to the cutting board during the operation of trimming or cutting the opposite sides of the packet of pleats.

The invention consists in certain novel combinations and arrangements of parts as will hereinafter be more fully pointed out and claimed. In the accompanying drawings I have illustrated one complete example of the physical embodiment of my invention wherein the parts are combined and arranged according to the best mode I have thus far devised for the practical application of the principles of my invention.

Figure 1 is a plan view of the device of my invention with the presser plate omitted for convenience of illustration.

Figure 2 is a top plan view of the detached presser plate.

Figure 3 is an edge view of the device, showing the presser plate in dotted line position.

Figure 4 is an end view of the device as seen from the left in Figure 1.

Figure 5 is a transverse sectional view as at line 5—5 of Figure 1.

Figure 6 is a plan view of one of a pair of adjustable pin plates of the holder.

Figure 7 is an edge view of the pin plate of Figure 6.

Figure 8 is enlarged, broken, longitudinal, vertical sectional view of the holder and guide with an end of a packet of pleats pinned therein.

Figure 9 is a perspective view illustrating the utility of the cutting board and holder with relation to an electrically operated, manually controlled, cutter using a rotary disk or circular cutting blade.

In order that the utility and general arrangement of parts may readily be understood reference should first be had to Figure 9 wherein a motor operated cutter 1 is manually controlled by use for the handle 2, and provided with a rotary disk or cutter 3 and a flat base-guide 4, the latter adapted to glide or slide over the upper face 5 of the cutting board 6 as the cutter is manually pushed for its working stroke.

The board is supported in usual manner, as on a table, and the packet of material or goods here shown to be cut is indicated as 7 and constituting a plurality of box pleat centers, supported on the board in order that one edge at a time may be trimmed or cut.

The packet is retained in the combined holder and guide and the latter is removable and interchangeable with relation to the board in order that one edge as 8 may be trimmed by a working stroke of the cutter, then the holder and its contained packet are removed, turned around and replaced on the board in position to have the other edge of the packet trimmed by a second stroke of the cutter. The two longitudinal edges or sides of the packet are thus accurately and uniformly trimmed or cut along the parallel guide edges of the combined holder and guide in co-action with the rotary cutter.

The board is provided with a pair of side guide plates 9 secured thereto by screws 10, and the upper edges 11 of these side plates which project above the top face 5 of the board are utilized as guides for the base-guide 4 of the cutter sliding or gliding over the top of the board.

A suitable number of layers of material or pleats are formed in the packet, and these are retained in the holder which comprises a holder plate 12 and a presser or top plate 13, both fashioned preferably of brass, with goods extending ¼" wider on each side, and having complementary, parallel, straight side edges or guide edges for the rotary cutter 3.

The holder plate 12 is used as the base of the packet and the presser plate 13 is used on top of the packet, as a weight, to retain the pleats in proper position during the cutting operations.

The holder plate is fashioned with a pair of spaced, central, longitudinally extending slots 14 and 15 for use with a pair of complementary pin plates 17 and 18 which are relatively adjustable to accommodate various lengths of pleats, and to which the packet is directly attached or pinned. Each pin plate has a depressed tongue as 19 that fits neatly in one of the slots of the holder plate and an attaching pin as 20, 21 is rigidly fixed to this tongue for retaining the ends of the packet. The two spaced tongues seated in the slots 14 and 15 prevent lateral movement of the pin plates with relation to the holder plate and thus maintain the packet against lateral displacement.

The pin plates may be relatively adjusted on the holder plate to accommodate various lengths of pleats or material to be cut and for this purpose each pin plate is slotted as at 22 for the reception of a clamp screw 23 rigidly secured to the holder plate, which of course is perforated to receive the screw. With the pin plates in properly adjusted and fixed position on the holder plate the packet of pleats is pinned to the spaced pins of the respective plates, this being accomplished in suitable manner, with the pins passing upwardly through the packet near its respective ends, and the presser plate or weight 13 is fashioned with longitudinally extending slots 24 to accommodate the pins as they protrude from the packet. After the packet is pinned to the pin plates of the holder the presser plate is applied to the top of the packet for the purpose of compacting the packet to facilitate the cutting operation of the rotary disk.

The holder with its packet is now applied to the cutting board, and for retaining the holder with relation to the board, the presser plate and the holder plate are each fashioned with end slots 25 and 26 respectively, that co-act with supporting posts 27 located at the ends of the board.

These posts are each fixed to an adjustable slide plate 28, which is slotted at 29, and adjustable transversely of the board on a fixed base plate 30, spaced screws 31 being employed to hold the slide plate in adjusted position.

The slide plates may be moved transversely of the board and secured in adjusted position to bring the guide edges of the holder, supported on the posts, in desired relation to the guide plates or plate on the cutting board.

The utility of the holder and guide will be apparent from an inspection of Figure 9 where the cutter has partially trimmed one edge of the packet of pleats. After completion of this cut, the combined holder and guide and retained packet are removed from the posts 27, turned bodily around, and replaced on the posts, after which the other edge of the packet is trimmed or cut by another stroke of the motor operated and manually controlled cutter. In this manner successive packets of goods may with facility and accuracy be trimmed to a uniform width.

It will be understood that various changes and alterations may be made in the construction and arrangement of parts, within the scope of my claims without departing from the spirit of my invention.

Having thus fully described my invention, what I claim as new and desire to secure by Letters Patent is—

1. The combination with a cutting board of a holder having adjustable pin plates and means for retaining said plates in adjusted position, and a presser plate, for the purpose described.

2. The combination with a cutting board of a holder plate and detachable means for securing said parts together, spaced, adjustable attaching plates carried by the holder plate, and means for securing the adjustable plates to the holder plate.

3. The combination with a cutting board, of a removable and changeable holder comprising a holder plate, co-acting means on the plate and board for retaining the plate, relatively adjustable pin-plates carried by the holder plate, means for securing the pin plates in adjusted position, and a removable presser plate for the holder.

4. The combination with a cutting board having spaced posts, of a holder comprising a holder plate having end slots, spaced adjustable pin-plates on the holder plate, means for securing the pin plates in adjusted position, and a removable presser plate also having end slots.

5. The combination with a cutting board having transversely adjustable slide-plates and posts on said plates, of a holder comprising a holder plate having end slots, spaced adjustable attaching plates and means for securing them to the holder plate, and a presser plate having end slots.

6. The combination with a cutting board and spaced, transversely adjustable supports thereon, of a removable holder and guide having means for co-action with said supports, and spaced longitudinally adjustable attaching means carried by said holder.

7. The combination with a cutting board having a longitudinally extending guide-edge and spaced transversely adjustable supports on its upper face, of a holder having means for co-action with said supports, spaced, longitudinally adjustable attaching means carried by said holder, and a presser plate for the holder having retaining means for co-action with said supports.

8. A work holder and guide for a cutting board comprising a slotted holder plate, a pair of spaced pin-plates for co-action with the slotted holder plate and means for securing the pin plates to the holder plate, and a slotted presser plate for co-action with the pin plates.

9. A work holder and guide for a cutting board comprising a slotted holder plate, a pair of spaced slotted pin plates each having a depressed tongue for co-action with the slotted plate and an attaching pin on the tongue, set screws for the slotted pin plates, and a slotted presser plate for co-action with said pins.

In testimony whereof I have affixed my signature.

MORRIS L. KAPLAN.